(12) United States Patent
Webb

(10) Patent No.: US 7,373,285 B2
(45) Date of Patent: May 13, 2008

(54) APPLICATION OF PHASE BEHAVIOR MODELS IN PRODUCTION ALLOCATION SYSTEMS

(75) Inventor: Robert A. Webb, Katy, TX (US)

(73) Assignee: BP Corporation North America Inc., Warrenville, IL (US)

( * ) Notice: Subject to any disclaimer, the term of this patent is extended or adjusted under 35 U.S.C. 154(b) by 135 days.

(21) Appl. No.: 11/291,230

(22) Filed: Dec. 1, 2005

(65) Prior Publication Data

US 2006/0116856 A1    Jun. 1, 2006

Related U.S. Application Data

(60) Provisional application No. 60/632,329, filed on Dec. 1, 2004.

(51) Int. Cl.
*G06F 17/50* (2006.01)
*C09K 8/60* (2006.01)

(52) U.S. Cl. .................. 703/2; 703/9; 702/12; 73/1.16; 166/250.15; 166/300

(58) Field of Classification Search .................... 703/9, 703/12, 2; 702/12; 73/1.16, 1.59; 166/250.15, 166/300
See application file for complete search history.

(56) References Cited

U.S. PATENT DOCUMENTS

| | | | | |
|---|---|---|---|---|
| 4,988,389 | A * | 1/1991 | Adamache et al. | 166/302 |
| 7,216,507 | B2 * | 5/2007 | Cuellar et al. | 62/620 |
| 2002/0165671 | A1 * | 11/2002 | Middya | 702/12 |
| 2003/0005747 | A1 * | 1/2003 | van der Geest et al. | 73/1.16 |
| 2006/0116531 | A1 * | 6/2006 | Wonders et al. | 562/412 |
| 2006/0283207 | A1 * | 12/2006 | Pitman et al. | 62/620 |

* cited by examiner

*Primary Examiner*—Thai Phan
(74) *Attorney, Agent, or Firm*—John L. Wood

(57) ABSTRACT

The present invention is directed to a method for allocating revenue or taxes to individual fluid streams commingled during an oil and gas production process, the method includes commingling fluid streams to produce a commingled fluid stream; (2) utilizing a process simulation model to predict a phase change of each fluid stream in the commingled fluid stream, wherein the process simulation model predicts the phase change of all the individual fluid streams in the commingled fluid stream the phase change of each individual fluid stream in isolation of the commingled fluid stream, the phase change of all the individual fluid streams in the commingled fluid stream absent a single fluid stream; and (3) determining the difference in phases between the calculated phase change of all the in individual fluid streams in the commingled fluid stream and calculated phase change of all the individual fluid streams in the commingled fluid stream absent a single fluid stream.

13 Claims, 1 Drawing Sheet

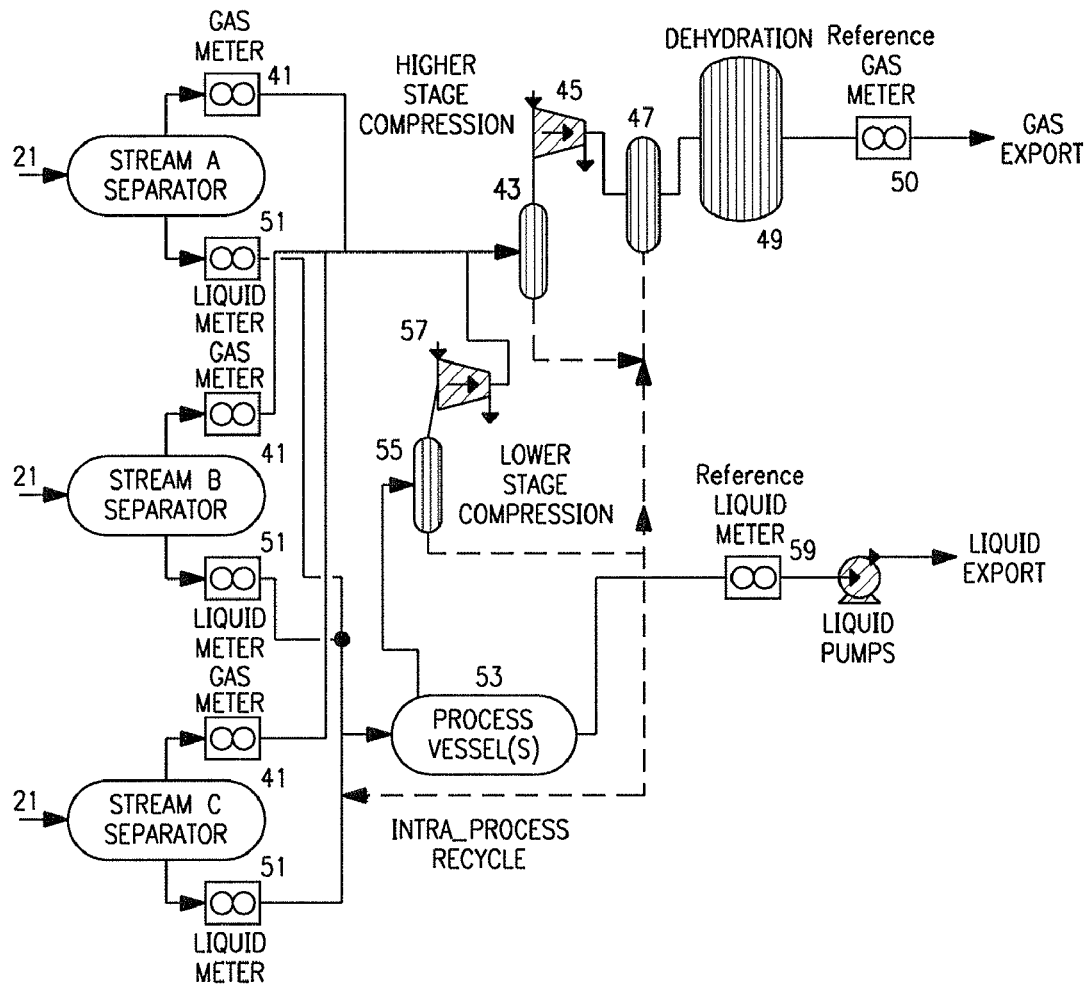
FIGURE

APPLICATION OF PHASE BEHAVIOR MODELS IN PRODUCTION ALLOCATION SYSTEMS

This patent application claims the benefit of U.S. Provisional Patent Application Ser. No. 60/632,329, entitled "Application of Phase Behavior Models in Production Allocation Systems," filed on Dec. 1, 2004.

FIELD OF INVENTION

The present invention relates to a method for allocating hydrocarbon streams, such as oil, and gas condensate, between multiple sources (e.g. wells, fields and/or wells) and destinations.

BACKGROUND OF THE INVENTION

In the U.S., the Minerals Management Services (MMS) of the U.S. Department of the Interior have allocation reporting requirements for all operators of onshore and offshore Federal and Indian oil and gas leases. Such reporting requirements are used to determine and distribute taxes and royalty revenue back to individual leases. Additionally, working interest owners of wells on oil and gas leases typically have allocation requirements to distribute sales revenues back to the individual working interest owners. These taxes, royalty fees and sales revenue associated in the production of oil and gas are substantial. Accurate and precise methods of allocation are important for the equitable distribution of such royalties, taxes and sales revenue. However, current methods of allocation are often less than accurate or precise. This is particularly true where royalties, taxes and sales revenue of commingled production streams must be allocated back to wells, leases and/or oil bearing formations having different owners and/or tax rates.

In addition to the potential disparity in ownership and tax rates, certain technical difficulties render current methods of allocation of taxes, royalty fees and sales revenue inexact. One such difficulty is that production streams commonly undergo phase changes due to varying temperature and pressure conditions that are often prevalent during the production and transport of hydrocarbon production streams, therefore yielding different proportions of gas and liquid from one measuring point to another.

For the allocation of a single production stream to a single working interest owner, such phase changes do not have a significant impact on the allocation of taxes, royalty fees and sales revenue to that working interest owner. However, such phase changes for commingled production streams can have a substantial impact on the allocation of taxes, royalty fees and sales revenue to multiple working interest owners. For instance, individual production streams with dissimilar gas, liquid and/or molecular composition undergo different phase changes during production and transport. Moreover, an individual production stream commingled with another stream will often experience a different phase change than that of an individual production stream passing through the oil and gas production process in isolation. Simply stated, commingled production streams (assuming dissimilarity in their respective gas and liquid compositions) will interact and influence the phase change of each other, making the determination of gas-liquid composition of each individual production stream inexact using current measurement and allocation methods.

Although these technical difficulties seem inconsequential given that the total mass of the production streams are constant, measurement and allocation systems are the basis of revenue assignment between all the affected parties (i.e. working interest owners, taxing authorities, etc.), and the real value of hydrocarbons in the form of gas (e.g. natural gas) and liquid (e.g. crude oil) are seldom equal. Therefore, each commingled stream's correct portion of the final gas and liquid streams should be known in order to ensure equity in the fiscal assignments. This is particularly important where ownership disparity and/or different tax rates amplifies inequitable fiscal assignments among the working interest owners. In light of these practicalities, the current measurement and allocation methods have only partially succeeded in ensuring equity in the fiscal assignments.

One current method of measurement and allocation is the plain proportional method, which is a non-modeled approach. In the plain proportional method, no phase modeling or phase calculations are conducted. Measurements from gas and liquid reference meters at the end of the oil and gas production process are simply proportioned back to the commingled input streams (e.g. streams A, B, and C) in accordance with the following equation (example of Stream A calculation):

$$StreamA_{Liquid} = Reference\ Meter_{Liquid} \times \left(\frac{Stream\ A_{Liquid}}{\sum Stream\ A \to C_{Liquid}}\right)$$

$$StreamA_{Gas} = Reference\ Meter_{Gas} \times \left(\frac{Stream\ A_{Gas}}{\sum Stream\ A \to C_{Gas}}\right)$$

Although the plain proportional method of allocation is commonly used, the plain proportional method assumes all streams under go the same phase behavior. It also ignores density and gas composition difference between the streams, both of which can have a substantial impact on the accuracy of the allocation.

Another method of measurement and allocation is the equation of state (EoS) method, which is another non-modeled approach. In the EoS method, each stream is individually evaluated via an equation of state as if the stream passes through a gas and oil production process in isolation. Equations of state are known in the art and are commonly used to predict and describe the physical properties of fluids, mixtures of fluids, and solids. Equations of state include the Soave-Redlich-Kwong Equation and the Peng-Robinson Equation.

During the EoS method, an equation of state is typically utilized to the liquid portion of the commingled production stream to produce two variables, the Shrink Factor and the Flash Factor. The Shrink Factor (SF) represents the amount of liquid volume reduction encountered during the production process due to the evolving of gas out of solution. The Flash Factor (FF) represents the amount of gas volume that is created within the process out of the liquid solution. More particularly, the SF is the ratio of the liquid volume at the end of the production process over the volume at the beginning of the production process. The FF is the reciprocal of the SF. The volume, pressure and temperature of one or more production streams are typically measured at inlet separator of the production process and are used in the selected EoS to determine the SF and FF.

Once the SF and the FF are determined, a Theoretical Oil (liquid) Volume (TOV) and Theoretical Gas Volume (TGV) is determined as follows:

$TOV$=Metered Oil Volume×$SF$ $TGV$=Metered Gas Volume+$TOV$×$FF$

Once the TOV and TGV are determined, the plain proportional method is followed, as shown below, with the exception of using the "theoretical volumes" that are a product of the EoS application (Example of stream A calculations):

$$Stream\ A_{Liquids} = Reference\ Meter_{Liquid} \times \left(\frac{TOV_A}{\sum TOV_{A \to C}}\right)$$

$$Stream\ A_{Gas} = Reference\ Meter_{Gas} \times \left(\frac{TGV_A}{\sum TGV_{A \to C}}\right)$$

Although the EoS method is a significant improvement over the plain proportional method, the EoS method still does not account for the interaction between the different fluids because the EoS method assumes their respective phase changes happen in isolation. Also, it does not account for the re-gasification of gas condensate in the intra-process recycle streams, which requires an iterative mathematic procedure to resolve.

Consequently, there is still a need for a system to accurately predict and assign the final quantities of gas and liquid independently to the individual commingled streams. More particularly, there is a still a need for an allocation method that accurately accounts for: (1) gas to liquid and liquid to gas phase changes of commingled streams within the oil and gas production process; and (2) the interaction between the different fluids in a commingled stream.

SUMMARY OF INVENTION

It has now been found that application of a phase behavior model, as described herein, in conjunction can accurately predict and assign the final quantities of gas and liquid independently the individual commingled production streams.

Therefore, the present invention is directed to a method for allocating revenue or taxes to individual fluid streams commingled during an oil and gas production process, the method includes commingling fluid streams to produce a commingled fluid stream; (2) utilizing a process simulation model to predict a phase change of each fluid stream in the commingled fluid stream, wherein the process simulation model predicts the phase change of all the individual fluid streams in the commingled fluid stream the phase change of each individual fluid stream in isolation of the commingled fluid stream, the phase change of all the individual fluid streams in the commingled fluid stream absent a single fluid stream; and (3) determining the difference in phases between the calculated phase change of all the in individual fluid streams in the commingled fluid stream and calculated phase change of all the individual fluid streams in the commingled fluid stream absent a single fluid stream.

The present invention provides for equity assurance in the assigned theoretical quantities where dissimilar fluids are commingled into a single stream and/or ownership disparity exists by eliminating inequitable distribution of costly accrued taxes, royalty fees and sales revenue.

The present invention also provides for by improved control and easy detection of errors in process stream measurements by monitoring the respective material balance of gas and liquid measurement streams within the process.

The present invention also provides for substantial savings in energy and fuel costs by allowing the capability of predicting energy requirements for compression and pumping equipment.

The present invention also provides for substantial savings in analytical costs and time by eliminating the need to perform a full pressure-volume-temperature analysis that is otherwise required in conventional non-modeled allocation systems.

BRIEF DESCRIPTION OF THE DRAWINGS

The FIGURE depicts a typical intra-stream oil and gas production process.

DETAILED DESCRIPTION

While this invention has many different embodiments, the figures, tables and detailed description illustrate the specific embodiments of the invention. However, the present disclosure is for the purposes of illustration and example, and is not intended to limit the invention to the specific embodiments disclosed herein.

In greater detail, the subject invention utilizes a phase-behavior model to predict the phase changes of one or more fluid streams throughout an oil and gas production process for the prediction and allocation of gas and liquid composition in the fluid streams.

Fluid streams suitable for the subject invention comprise crude oil, natural gas and gas condensate. As used herein, crude oil is defined as crude petroleum oil and one or more other hydrocarbons, regardless of gravity, produced at a well in a liquid state and which is not the result of condensation of gas.

As used herein, natural gas is defined as one or more hydrocarbons which at atmospheric conditions of temperature and pressure are in a gaseous state.

As used herein, gas condensate is defined as one or more hydrocarbons which are liquid when under atmospheric conditions and in a gaseous state when under the original conditions of a reservoir, and which are not obtained by the processes of absorption, adsorption, compression, refrigeration or a combination of such processes, and having a gravity higher than 40.9 degree API at 15.56° C.

Referring again to the FIGURE, which is illustrative of a typical intra-stream oil and gas production process 10, one or more fluid streams is introduced into line 21. Once the fluid stream is introduced into line 21, it is sent to inlet separator 31 wherein the fluid stream is separated into a first gas stream and a first liquid stream. The gas stream is then introduced into gas meter 41, wherein the quantity of gas in the gas stream is measured, thereby creating a first measured gas stream. Gas meter 41 can be of any type known in the art. The measured gas stream is then introduced into a second separator 43, wherein the first measured gas stream is separated into a first intra-process recycle stream and a second gas stream. The second gas stream is introduced into compressor 45, wherein the second gas is compressed, creating a compressed gas stream. The compressed gas stream is thereafter introduced into a third separator 47, wherein the compressed gas stream is separated into a third gas stream and a third intra-process recycle stream. The third gas stream then undergoes a dehydration step 49, and then introduced into reference gas meter 50, wherein the quantity (volume or mass) of gas in the third gas stream is measured, creating a gas export stream.

The first liquid stream exiting separator 31 is introduced into liquid meter 51 is introduced into liquid meter 51, wherein the quantity (volume or gas) of liquid in the liquid stream is measured, creating a measured liquid stream. The measured liquid stream is then introduced into process vessel 53, wherein the measured liquid stream is separated into a processed gas stream and a processed liquid stream. The processed liquid stream is introduced into reference liquid meter 59, wherein the quantity of liquid in the processed liquid stream is measured, creating an export liquid stream. The processed gas stream exiting the process vessel 53 is introduced into separator 55, wherein the processed gas stream is separated into a second processed gas stream and a third intra-process recycled stream. The second processed gas stream is introduced into compressor 57, wherein the second processed gas stream is compressed, creating a compressed processed gas stream. The compressed processed gas stream is thereafter commingled with the first measured gas stream.

Phase behavior models, also called process simulation models (PSM), suitable for the subject invention can be of any type known in the art that are capable of calculating the quantity (volume or mass) of hydrocarbon liquid and gas present in separate phases in one or more fluid streams at a particular pressure and temperature other than the pressure and temperature condition at the time of measurement, given a measured (metered) quantity of liquid and/or gas in a single phase knowing the pressure and temperature conditions and the hydrocarbon composition (i.e. $C_1$ through $C_n$) at a particular measurement point. Such process simulation models are commercially available from companies like Aspen Technologies (Brand name HYSYS), and include brand names such as HYSYS, ProSim, and HySim. In a preferred embodiment, the process simulation model uses an equation of state, preferably a cubic equation of state, such as the Peng-Robinson or Soave-Redlich-Kwong equation of state. Application of an equation of state in process simulation models is disclosed in Suppes, G. J., year unknown. "Selecting Thermodynamic Models for Process Simulation of Organic VEL and LLE Systems", Department of Chemical Engineering, The University of Missouri-Columbia, which is incorporated herein by reference.

In a preferred embodiment, all components (i.e. methane, ethane, etc.) are identified by their proper name and their physical properties are those commonly known in the industry, the last component of the analysis preferably represents itself and all other heavier components. Preferably, the phase behavior model is also depicted within a flow process graphic and verified by the appropriate facility engineers to ensure that the physical process (piping configuration, separation vessel, compression, etc.) has been depicted properly. All quantity (meters) pressure and temperature inputs to the model are preferably clearly identified and confirmed as to their relevance to the process. This is preferably done within a measurement process flow diagram. Those skilled in the art of such process modeling understand and appreciate the impact that disparities in process design and/or the population of data inputs may have on quantitative values derived from such process modeling.

Data suitable for input into PSM include, but are not limited to gas measured quantities, (mass or volume), liquid measured quantities (mass or volume), hydrocarbon composition of the fluid stream, fluid stream pressure and fluid stream temperature. For the purposes herein, the liquid measured quantities are also known as Measured Oil Volume (MOV) and Measured Gas Volume (MGV). The MOV and MGV can be determined by any method known in the art and at any point during the gas and oil production process. However, it is preferred that the MOV and MGV are determined at the inlet separator. Preferably, the MOV is the actual measured volume, not corrected to standard condition for pressure and temperature, less water (dry-oil barrels).

Preferably, the MGV measured is at standard conditions, reduced for water vapor content at average operating pressure and temperature (dry-gas SCF) and adjusted to an ideal gas volume basis. The hydrocarbon composition of the fluid stream can be determined by any method known in the art, but is preferably based on proportional-to-flow samples. It is preferred that the hydrocarbon composition of the liquid phase of fluid stream is determined through the $C_{30}$-plus component ($OCA_{C1-C30+}$) and the hydrocarbon composition of the gas phase of the fluid stream is determined through the $C_{10}$-plus component ($GCA_{C1-C10+}$). It is also preferred that the relevant average pressure and temperature data for the entire oil and gas production process, preferably over the entire allocation period.

When applying the PSM in accordance with the subject invention, it is preferred that all of the input fluid streams are collectively modeled through the PSM to develop the best estimation of the theoretical quantity (volume or mass) for gas and liquid at the oil and gas production process endpoints. This calculation is referred to as the "Combined PSM Calculation" where all input fluid streams are taken in combination. Preferably, two theoretical quantities are determined, namely one for gas and one for liquid. The theoretical quantity liquid is represented as q and the theoretical quantity for gas is represented as $q_g$. These quantities represent an estimation of the amount (volume or mass) of gas and liquid available at the endpoint of the oil and gas production process based on the input data, their respective compositional makeup, and the various pressure and temperature changes relative to the oil and gas production process.

When applying the PSM in accordance with the subject invention, it is also preferred that all of the input fluid streams are modeled through the PSM, as if in isolation. This calculation is referred to as the "Individual PSM Calculation." This is accomplished by determining the projected theoretical quantity when an input stream is considered by itself (i.e. no commingling). q' represents the "individual" calculation. The quantities derived from this run represent the export quantities as if no commingling of multiple fluid streams were present.

When applying the PSM in accordance with the subject invention, it is also preferred that all of the input fluid streams are modeled through the PSM with the exception of an input fluid stream. This calculation is referred to as the "Exception PSM Calculation." An Exception PSM Calculation is similar to a Combined PSM Calculation, except that the inputs for a particular Inlet Separator are preferably set to zero (0). In essence, the Exception PSM Calculation is a series of exception runs omitting one fluid stream. In a three fluid stream production process, for example, as depicted in the FIGURE, stream A and stream B are modeled through the PSM, stream B and stream C are modeled through the PSM, and stream A and C are modeled through the PSM. The difference between quantities for each exception run and the quantity q derived from the combined PSM calculation is then determined, which is represented by the following equation:

$$q''_i = q - q_{xi}$$

This calculation (q double prime) is called a "by-difference" quantity. The sum of the by-difference quantities are then determined and compared to the quantity determined in the Combined PSM Calculation to quantify a differential that typically exists between the two values. The differential is represented by the following equation:

$$\delta q = q - \Sigma''_i q''_i$$

The differential often represents a significant difference in the PSM calculations due to the interaction of the different fluid types. The dissimilarity of the fluid properties causes a change in the result each time the PSM calculation is performed. Removing one stream from the combination constitutes a change in the overall "combined" fluid properties. It is believed that the differential between the Combined PSM Calculation and each Exception PSM Calculation better represents each fluid streams proportion of the Combined PSM Run than does the Individual PSM Run.

When applying the PSM in accordance with the subject invention, it is also preferred that the differential between the combined calculation and the by-difference calculation is incorporated back into the allocation system. Based on the individual calculation (q') in comparison to the by-difference calculations (q") an assignment of the differential is made so that the sum of the quantities assigned to each input will balance to the total quantity (q) determined in the combined calculation. The process of assigning the differential is referred to as an "optimization" since it optimizes the assigned quantities to fit the combined calculation.

In a preferred embodiment, a simple approach is to assign the differential proportionally based on the by-difference calculation. In yet another embodiment another way to distribute the differential is based on their respective change between their by-difference calculation (q") and their individual calculation (q'). The following formula represents this relationship:

$$\delta q_i = \left(\frac{q'_i - q''_i}{\sum_{1}^{n}(q'_i - q''_i)}\right) \times \left(q - \sum_{1}^{n} q''_i\right)$$

The differential created is distinctively either positive or negative. While, incorporated into the differential is any offsetting positive and negative changes, It is believed that the resulting positive or negative differential was created more by those streams changing in the same (positive or negative) direction as the differential. Thus, there remains a difference called the PSM Imbalance. The PSM Imbalance is noted in three ways (i.e. oil volume, gas volume, and gas volume per component). However, unlike UBA where all inputs are assume to have additively created the imbalance, in this case a means to determine if an input contributed positively or negatively is possible.

Therefore, a more optimal approach is to divide the net negative or positive differential (dq) among only the input fluid stream demonstrating a like positive or negative change between the individual calculation (q') and the by-difference calculation (q"). These particular inputs are designated as "participating" (part) and the other input streams are non-participating (nonpart). The participating and non-participating differentials are defined such that:

$$\sum_{1}^{n} \delta q_{i,part} \equiv \delta q$$

and;

$$\delta q_{i,non\text{-}part} \equiv 0$$

When considering only the participating input streams and considering the relative change between the individual and by-difference calculations, the following equation emerges as the assigned differential:

$$\delta q_{i,part} = \left[\frac{q'_i - q''_i}{\sum_{1,part}^{n,part}(q'_i - q''_i)} \times (\delta q)\right]$$

Although the present invention has been described with particularity and detail, the following example provides further illustration of the invention and is understood not to limit the scope of the invention.

EXAMPLE

The example is a detailed process simulation comparing the modeled approach, substantially in accordance with the present invention, to the non-modeled approach for measurement and allocation of commingled production streams. A HYSES process simulation model is the PSM of choice for the simulation. The Peng-Robinson equation of state is chosen for application in the PSM. The oil and gas production process flow diagram used in the simulations is substantially in accordance with the FIGURE. The molecular composition for stream A, stream B and stream C is depicted in Table 1. The pressure and temperatures of the gas component of the streams were 125° F. at 240 psig as measured at the outlet of the inlet separator. The pressure and temperatures of the liquid component of stream A, stream B and stream C were 100.1° F. at 240 psig as measured at the outlet of the inlet separator. The oil and gas prices are set at U.S. $30.00 per barrel U.S. $4.00 per MMBTU, respectively. The quantities derived from calculations in accordance with the subject invention are set forth Table 2. The results of the comparison are set forth in Tables 3.

CONCLUSION

Table 3 shows the relative theoretical volume of oil and gas for the typical "non-modeled approach," followed by the same calculation using the model approach in accordance with the subject invention. Since the model and the non-model approaches begin with the same input quantities and their differences lie in the proportioning of the final quantities, no greater or less mass is generated. Although the net difference is zero in total revenue assigned, table 3 clear shows a substantial net difference in revenue assigned to the streams A, streams B and streams C.

Overall the primary benefit is equity assurance in the assigned theoretical quantities. This is particularly important where dissimilar fluids are commingled into a single stream and/or ownership disparity exists by eliminating inequitable distribution of costly accrued taxes, royalty fees and sales revenue. Based on the direction of large oil and gas operations, disparity of ownership together with dissimilarity of fluids is a continuing reality. The consequences when applied to oil and gas valuation make the use of phase-behavior models in production allocation systems advantageous. Continued use of non-modeled systems introduce biases that over the life of a production facility will likely disadvantage one party over another well beyond the capital cost associated with oil and gas production required to establish and operate the PSM.

Another benefit is that utilizing PSM as described and claimed herein improves the system balance when viewed as a liquid and gas balance independently. Since the gas and liquid measurement systems within the process operate somewhat independently, monitoring their respective material balance independently is an advantage over a simple mass balance for the entire gas-liquid combined systems. The overall measurement system is better controlled and mis-measurements are more easily detected.

Another benefit is the capability of predicting energy requirements for compression and pumping equipment. Normally the most detailed portion of the allocation systems is the fuel assignment. Since each stream requires a different amount of fuel for processing, the fuel assignment must be very detailed in order to allocate the consumed gas properly. Calculating a proper fuel allocation is very tedious. The PSM however, when calculating a stream on an individual basis, can predict the energy required for compression (the major fuel consumption need). This becomes a theoretical fuel and is called the "primary fuel". The fuel for smaller equipment, crew quarters, light, etc. is called the residual fuel and is taken as the difference between the total measured fuel gas and the sum of the theoretical fuel calculated by the PSM. The residual fuel is normally small compared to the primary fuel and is allocated on a general produced volume basis. This simplifies the fuel assignment a great deal.

Another benefit is a general reduction in sampling and a simplification of the analytical process. Previously, non-modeled approaches required a determination of the shrinkage and flash factors. This is extremely difficult and costly to do precisely. The best approach has always been to perform a full PVT (pressure-volume-temperature) analysis which can range up to US $3,000 per test. Short-cuts have also been developed to avoid a full PVT analysis but this normally involves an EoS and detailed compositional analysis. These "short-cut" tests have traditionally been hampered by high random uncertainty, resulting in degradation in the confidence level in their results. The short-cut test cost about US $1,000 per test. By utilizing a modeled approach, only the composition of the liquid and gas is needed to be known. As a comparison to past practice, the simple composition tests are more easily performed which results in better repeatability and reproducibility and thus instill higher confidence. Composition tests generally cost less the more complex tests.

Additionally, use of the model can validate samples. Whenever a liquid or gas sample composition is determined, the model is used along with the pressure and temperature of the associated separation vessel to check the sample. If the model indicates that a liquid sample does not exist fully as a liquid, or visa versa for a gas sample, the samples are disqualified. Normally this indicates that some free gas or free liquids were inadvertently introduced to the sample. Overall, however, the greatest sampling advantage found by using phase-behavior modeling, is that the laboratory analysis is simplified. The laboratories can concentrate on what they do best; compositional analysis.

Based on the direction of large oil and gas operations, disparity of ownership together with dissimilarity of fluids is a continuing reality. The consequences when applied to oil and gas valuation make the use of phase-behavior models in production allocation systems advantageous. Continued use of non-modeled systems introduce biases that over the life of a production facility will likely disadvantage one party over another well beyond the capital cost associated with oil and gas production required to establish and operated the PSM.

TABLE 1

|  | Gas | | | Liquid | | |
| --- | --- | --- | --- | --- | --- | --- |
|  | A | B | C | A | B | C |
| Methane | 0.8906 | 0.8954 | 0.9647 | 0.0642 | 0.2129 | 0.4346 |
| Ethane | 0.0194 | 0.0435 | 0.0109 | 0.0152 | 0.0299 | 0.0190 |
| Propane | 0.0384 | 0.0303 | 0.0112 | 0.0285 | 0.0368 | 0.0360 |
| i-Butane | 0.0050 | 0.0069 | 0.0021 | 0.0108 | 0.0233 | 0.0248 |
| n-Butane | 0.0188 | 0.0093 | 0.0060 | 0.0312 | 0.0376 | 0.0293 |
| i-Pentane | 0.0161 | 0.0038 | 0.0019 | 0.0171 | 0.0280 | 0.0303 |
| n-Pentane | 0.0083 | 0.0042 | 0.0024 | 0.0220 | 0.0370 | 0.0287 |
| n-Hexane | 0.0016 | 0.0041 | 0.0003 | 0.0248 | 0.0704 | 0.0373 |
| n-Heptane | 0.0004 | 0.0019 | 0.0002 | 0.0311 | 0.1372 | 0.0843 |
| n-Octane | 0.0004 | 0.0003 | 0.0001 | 0.0496 | 0.1628 | 0.0575 |
| n-Nonane | 0.0004 | 0.0002 | 0.0001 | 0.0313 | 0.0699 | 0.0327 |
| n-Decane | 0.0007 | 0.0002 | 0.0001 | 0.0319 | 0.0579 | 0.0362 |
| n-C11 | 0.0000 | 0.0000 | 0.0000 | 0.0383 | 0.0345 | 0.0292 |
| n-C12 | 0.0000 | 0.0000 | 0.0000 | 0.0392 | 0.0187 | 0.0218 |
| n-C13 | 0.0000 | 0.0000 | 0.0000 | 0.0441 | 0.0130 | 0.0194 |
| n-C14 | 0.0000 | 0.0000 | 0.0000 | 0.0456 | 0.0073 | 0.0153 |
| n-C15 | 0.0000 | 0.0000 | 0.0000 | 0.0444 | 0.0050 | 0.0133 |
| n-C16 | 0.0000 | 0.0000 | 0.0000 | 0.0369 | 0.0026 | 0.0094 |
| n-C17 | 0.0000 | 0.0000 | 0.0000 | 0.0366 | 0.0019 | 0.0083 |
| n-C18 | 0.0000 | 0.0000 | 0.0000 | 0.0317 | 0.0012 | 0.0069 |
| n-C19 | 0.0000 | 0.0000 | 0.0000 | 0.0311 | 0.0008 | 0.0056 |
| n-C20 | 0.0000 | 0.0000 | 0.0000 | 0.0264 | 0.0005 | 0.0043 |
| n-C21 | 0.0000 | 0.0000 | 0.0000 | 0.0233 | 0.0003 | 0.0035 |
| n-C22 | 0.0000 | 0.0000 | 0.0000 | 0.0200 | 0.0002 | 0.0027 |
| n-C23 | 0.0000 | 0.0000 | 0.0000 | 0.0191 | 0.0002 | 0.0025 |
| n-C24 | 0.0000 | 0.0000 | 0.0000 | 0.0163 | 0.0002 | 0.0020 |
| n-C25 | 0.0000 | 0.0000 | 0.0000 | 0.0169 | 0.0016 | 0.0015 |
| n-C26 | 0.0000 | 0.0000 | 0.0000 | 0.0143 | 0.0016 | 0.0014 |
| n-C27 | 0.0000 | 0.0000 | 0.0000 | 0.0138 | 0.0012 | 0.0001 |
| n-C28 | 0.0000 | 0.0000 | 0.0000 | 0.0115 | 0.0010 | 0.0009 |
| n-C29 | 0.0000 | 0.0000 | 0.0000 | 0.0110 | 0.0012 | 0.0009 |
| n-C30 | 0.0000 | 0.0000 | 0.0000 | 0.1218 | 0.0032 | 0.0001 |
|  | 1.0000 | 1.0000 | 1.0000 | 1.0000 | 1.0000 | 1.0000 |

TABLE 2

| Input $q_i$ | By-Difference $q''_i$ | Individual $q'_i$ | Difference $q'_i - q''_i$ | Differential $\delta q_i$ |
| --- | --- | --- | --- | --- |
| CASE 1 - Typical | | | | |
| Stream A | 1,710,000.19 | 1,712,668.35 | 2,668.15 | 1,264.55 |
| Stream B | 760,651.02 | 763,357.10 | 2,706.08 | 1,282.53 |
| Stream C | 92,230.54 | 92,076.96 | −153.58 | −72.79 |
| Sum | 2,562,881.76 | 2,568,102.41 | 5,220.65 | 2,474.29 |
| Combined (q) | 2,565,356.05 | Sum of absolute values | | 2,619.86 |
| Difference $q - \Sigma q''_i$ | 2,474.29 | Divergence $\dfrac{\Sigma(\|\delta q_i\| - \delta q_i)}{\Sigma \delta q_i}$ | | 0.059 |
| CASE 2 - Extreme | | | | |
| Stream A | 1,708,027.46 | 1,719,914.73 | 11,887.27 | 950.76 |
| Stream B | 751,729.17 | 752,818.25 | 1,089.08 | 87.11 |
| Stream C | 91,485.71 | 89,086.16 | −2,399.55 | −191.92 |
| Sum | 2,551,242.34 | 2,561,819.14 | 10,576.80 | 845.95 |
| Combined (q) | 2,552,088.29 | Sum of absolute values | | 1,229.79 |
| Difference $q - \Sigma q''_i$ | 845.95 | Divergence $\dfrac{\Sigma(\|\delta q_i\| - \delta q_i)}{\Sigma \delta q_i}$ | | 0.454 |

TABLE 3

| Stream Fluid Type | | Measured Quantities | Theoretical Quantities | Allocated Quantities | Total Value |
|---|---|---|---|---|---|
| Typical Approach (Non-Modeled) | | | | | |
| Stream A | Oil (Bbls.) | 1,800,000 | 1,706,966 | 1,733,314 | $51,999,411 |
| Black Oil | Gas (MMBTU) | 737,369 | 892,454 | 837,048 | 3,348,194 |
| Stream B | Oil (Bbls.) | 900,000 | 733,300 | 744,619 | 22,338,561 |
| Gas Condensate | Gas (MMBTU) | 1,769,360 | 2,364,437 | 2,217,647 | 8,870,587 |
| Stream C | Oil (Bbls.) | 120,000 | 86,095 | 87,424 | 2,622,709 |
| Gas | Gas (MMBTU) | 2,076,610 | 2,267,232 | 2,126,477 | 8,505,908 |
| Modeled Approach | | | | | |
| Stream A | Oil (Bbls.) | 1,800,000 | 1,710,000 | 1,711,651 | 51,349,533 |
| Black Oil | Gas (MMBTU) | 737,369 | 857,130 | 856,375 | 3,425,499 |
| Stream B | Oil (Bbls.) | 900,000 | 760,651 | 761,385 | 22,841,561 |
| Gas Condensate | Gas (MMBTU) | 1,769,360 | 2,096,955 | 2,095,108 | 8,380,433 |
| Stream C | Oil (Bbls.) | 120,000 | 92,231 | 92,320 | 2,769,588 |
| Gas | Gas (MMBTU) | 2,076,610 | 2,231,655 | 2,229,689 | 8,918,756 |
| Difference Modeled minus Non-Modeled | | | | | |
| Stream A | Oil (Bbls.) | | 3,035 | −21,663 | (649,879) |
| Black Oil | Gas (MMBTU) | | −35,324 | 19,326 | 77,305 |
| Stream B | Oil (Bbls.) | | 27,351 | 16,767 | 503,000 |
| Gas Condensate | Gas (MMBTU) | | −267,481 | −122,538 | (490,153) |
| Stream C | Oil (Bbls.) | | 6,136 | 4,896 | 146,879 |
| Gas | Gas (MMBTU) | | −35,578 | 103,212 | 412,848 |
| Net difference in revenue | | | | Stream A | (572,574) |
| | | | | Stream B | 12,847 |
| | | | | Stream C | 559,727 |
| Total Net difference | | | | | 0 |

APPENDIX A

| | |
|---|---|
| q | stands for a quantity predicted by the PSM considering all input stream simultaneously |
| $q_{xi}$ | stands for a quantity predicted by the PSM considering all input stream simultaneously except the $i^{th}$ stream |
| $q_i$? | stands for the "by-difference" quantity predicted by the PSM (see equation 1) |
| dq | stands for the total differential between the PSM predicted quantity considering all stream simultaneously and the sum of the "by-difference" |
| $dq_i$ | stands for the portion of the differential assignable to the $i^{th}$ stream |
| $dq_{i,part}$ | stands for the portion of the differential assignable to the $i^{th}$ (participating) stream, where a like change between individual and by-difference calculations either positive or negative as compared to the differential either positive or negative, constitutes participation |
| $dq_{i,non-part}$ | stands for the portion of the differential assignable to the $i^{th}$ (non-participating) stream, which is always equal to zero. |

That which is claimed is:

1. A method for allocating revenue or taxes to individual fluid streams commingled during an oil and gas production process, the method comprising the steps of:
   a. commingling the individual fluid streams, producing a commingled fluid stream;
   b. utilizing a process simulation model to predict a phase change of each individual fluid stream in the commingled fluid stream, wherein the process simulation model predicts: i. the phase change of the combination of all the individual fluid streams contained in the commingled fluid stream; ii. the phase change of each individual fluid stream alone in isolation from the commingled fluid stream; and iii. the phase change of the commingled fluid stream absent a single individual fluid stream;
   c. determining a difference in phases between the calculated phase change of the commingled fluid stream and a calculated phase change of the commingled fluid stream absent a single individual fluid stream.

2. The method of claim 1, wherein the fluid stream comprises crude oil.

3. The method of claim 1, wherein the fluid stream comprises condensate.

4. The method of claim 1, wherein the fluid stream comprises natural gas.

5. The method of claim 1, wherein the process simulation model utilizes an equation of state.

6. The method of claim 5, wherein the equation of state is the Soave-Redlich-Kwong equation or the Peng-Robinson equation.

7. The method of claim 1, wherein the phase change of a plurality of fluid streams is determined.

8. A method for allocating revenue or taxes to individual fluid streams commingled during an oil and gas production process, the method comprising the steps of:
   a. commingling the individual fluid streams, producing a commingled fluid stream;
   b. utilizing a process simulation model to predict a phase change of each individual fluid stream in the commingled fluid stream, wherein the process simulation model predicts: i. the phase change of the commingled fluid stream; ii. the phase change of each individual fluid stream alone; and, iii. the phase change of the commingled fluid stream absent a single individual fluid stream;
   c. determining a difference in phases between the calculated phase change of the commingled fluid stream and a calculated phase change of the commingled fluid stream absent a single individual fluid stream; and,
   d. determining the phase change of at least the absent individual fluid stream, the difference being indicative of the phase change of the absent individual fluid stream in the commingled fluid stream.

9. The method of claim 8, wherein the fluid stream comprises crude oil.

10. The method of claim 8, wherein the fluid stream comprises condensate.

11. The method of claim 8, wherein the fluid stream comprises natural gas.

12. The method of claim 8, wherein the process simulation model utilizes an equation of state.

13. The method of claim 12, wherein the equation of state is the Soave-Redlich-Kwong equation or the Peng-Robinson equation.

* * * * *